(12) United States Patent
Mizumoto et al.

(10) Patent No.: US 12,400,550 B2
(45) Date of Patent: Aug. 26, 2025

(54) FLIGHT PATH GENERATION APPARATUS, AIRCRAFT SYSTEM, FLIGHT PATH GENERATION METHOD, AND READABLE MEDIUM

(71) Applicant: NEC Corporation, Tokyo (JP)

(72) Inventors: Hisashi Mizumoto, Tokyo (JP); Toshiaki Yamashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 364 days.

(21) Appl. No.: 17/917,297

(22) PCT Filed: Apr. 16, 2020

(86) PCT No.: PCT/JP2020/016767
§ 371 (c)(1),
(2) Date: Oct. 6, 2022

(87) PCT Pub. No.: WO2021/210139
PCT Pub. Date: Oct. 21, 2021

(65) Prior Publication Data
US 2023/0177967 A1 Jun. 8, 2023

(51) Int. Cl.
*G08G 5/32* (2025.01)
*G05D 1/646* (2024.01)
(Continued)

(52) U.S. Cl.
CPC ............... *G08G 5/34* (2025.01); *G05D 1/646* (2024.01); *G06Q 30/04* (2013.01); *G08G 5/00* (2013.01);
(Continued)

(58) Field of Classification Search
CPC .. G08G 5/0039; G08G 5/0069; G08G 5/0043; G05D 1/101; G05D 1/104;
(Continued)

(56) References Cited

U.S. PATENT DOCUMENTS 10,074,283 B1 * 9/2018 de Oliveira .......... G08G 5/0026
10,867,519 B2 * 12/2020 Mecklem ............. G08G 5/0052
(Continued)

FOREIGN PATENT DOCUMENTS

JP 2002-203295 A 7/2002
JP 2018-513456 A 5/2018
(Continued)

OTHER PUBLICATIONS

JP Office Action for JP Application No. 2022-515145, mailed on Sep. 19, 2023 with English Translation.
International Search Report for PCT Application No. PCT/JP2020/016767, mailed on Jun. 30, 2020.

*Primary Examiner* — Dino Kujundzic
(74) *Attorney, Agent, or Firm* — Sughrue Mion, PLLC

(57) ABSTRACT

A flight path generation apparatus (300) is configured to generate a flight path for an aircraft (100) capable of autonomously flying, and includes: an airframe information acquisition unit (301) configured to acquire airframe information including airframe IDs and take-off places of a plurality of aircraft (100); a movement information acquisition unit (302) configured to acquire movement information related to scheduled take-off times and destinations of the plurality of aircraft; a generation unit (303) configured to generate flight paths from the take-off places to landing places corresponding to the destinations based on the airframe information and the movement information; and a communication unit (304) configured to transmit the flight paths to the aircraft.

14 Claims, 4 Drawing Sheets

(51) Int. Cl.
  *G06Q 30/04* (2012.01)
  *G08G 5/00* (2006.01)
  *G08G 5/26* (2025.01)
  *G08G 5/34* (2025.01)
  *G08G 5/55* (2025.01)
  *G08G 5/56* (2025.01)
  *G08G 5/57* (2025.01)
  *G08G 5/59* (2025.01)
  *G08G 5/76* (2025.01)
  *G08G 5/72* (2025.01)

(52) U.S. Cl.
  CPC ............... *G08G 5/26* (2025.01); *G08G 5/32* (2025.01); *G08G 5/55* (2025.01); *G08G 5/56* (2025.01); *G08G 5/57* (2025.01); *G08G 5/59* (2025.01); *G08G 5/76* (2025.01); *G08G 5/727* (2025.01)

(58) Field of Classification Search
  CPC .... G05D 1/1062; G05D 1/1064; G05D 1/646; G05D 2109/20
  See application file for complete search history.

(56) References Cited

U.S. PATENT DOCUMENTS

| | | | |
|---|---|---|---|
| 11,238,745 B2* | 2/2022 | Villa | G08G 5/0034 |
| 2009/0112645 A1* | 4/2009 | Jha | G06Q 10/10 705/7.12 |
| 2016/0225265 A1* | 8/2016 | Pierre | G08G 5/0047 |
| 2017/0092136 A1* | 3/2017 | Agrawal | G01C 21/02 |
| 2018/0090014 A1* | 3/2018 | Kline | G06Q 10/047 |
| 2018/0366011 A1* | 12/2018 | Blanchon | G08G 5/0013 |
| 2019/0311634 A1* | 10/2019 | Lax | G08G 5/0047 |
| 2021/0082208 A1* | 3/2021 | Surace | G05D 1/69 |
| 2021/0110444 A1* | 4/2021 | Schwartz | G08G 5/53 |
| 2021/0295717 A1* | 9/2021 | Zammit-Mangion | G05D 1/0011 |

FOREIGN PATENT DOCUMENTS

| | | |
|---|---|---|
| JP | 6475898 B1 | 2/2019 |
| JP | 2020-513122 A | 4/2020 |
| WO | 2019/188250 A1 | 10/2019 |

* cited by examiner 300, 400, 100

FLIGHT PATH GENERATION APPARATUS, AIRCRAFT SYSTEM, FLIGHT PATH GENERATION METHOD, AND READABLE MEDIUM

This application is a National Stage Entry of PCT/JP2020/016767 filed on Apr. 16, 2020, the contents of all of which are incorporated herein by reference, in their entirety.

TECHNICAL FIELD

The present disclosure relates to a flight path generation apparatus, an aircraft system, a flight path generation method, and a readable medium.

BACKGROUND ART

Patent Literature 1 discloses a system for enabling a UAV (Unmanned Aerial Vehicle) to make a planned landing and an emergency landing. The UAV takes off from a transport vehicle and lands on the transport vehicle. In Patent Literature 1, a fixed fee may be paid to allow the UAV to land the transport vehicle, or a fee may be paid each time the UAV is allowed to land the transport vehicle.

Patent Literature 2 discloses a management apparatus for a hangar facility in which an aircraft lands. The hangar facility management apparatus associates aircraft identification information, a landing time, and a port ID with each other, and transmits them to another hangar facility management apparatus.

CITATION LIST

Patent Literature

Patent Literature 1: Published Japanese Translation of PCT International Publication for Patent Application, No. 2018-513456
Patent Literature 2: International Patent Publication No. WO2019/188250

SUMMARY OF INVENTION

Technical Problem

There has been a demand for a technology for managing aircraft such as unmanned aerial vehicles more efficiently.

The present disclosure has been made in order to solve the above-described problem, and an object thereof is to provide a flight path generation apparatus, an aircraft system, a flight path generation method, and a readable medium capable of efficiently managing a plurality of aircraft.

Solution to Problem

A flight path generation apparatus according to the present disclosure is a flight path generation apparatus configured to generate a flight path for an aircraft capable of autonomously flying, including: an airframe information acquisition unit configured to acquire airframe information including airframe IDs and take-off places of a plurality of aircraft; a movement information acquisition unit configured to acquire movement information related to scheduled take-off times and destinations of the plurality of aircraft; a generation unit configured to generate flight paths from the take-off places to landing places corresponding to the destinations based on the airframe information and the movement information; and a communication unit configured to transmit the flight paths to the aircraft.

An aircraft system according to the present disclosure is a flight path generation system configured to generate a flight path for an aircraft capable of autonomously flying, including: an airframe information acquisition unit configured to acquire airframe information including airframe IDs and take-off places of a plurality of aircraft; a movement information acquisition unit configured to acquire movement information related to scheduled take-off times and destinations of the plurality of aircraft; a generation unit configured to generate flight paths from the take-off places to landing places corresponding to the destinations based on the airframe information and the movement information; a communication unit configured to transmit the flight paths to the aircraft; and an aircraft configured to autonomously fly along a flight path received from the communication unit.

A flight path generation method according to the present disclosure is a flight path generation method for generating a flight path for an aircraft capable of autonomously flying, including: a step of acquiring airframe information including airframe IDs and take-off places of a plurality of aircraft; a step of acquiring movement information related to scheduled take-off times and destinations of the plurality of aircraft; a step of generating flight paths from the take-off places to landing places corresponding to the destinations based on the airframe information and the movement information; and a step of transmitting the flight paths to the aircraft.

A readable medium according to the present disclosure is a non-transitory computer readable medium storing a program for causing a computer to perform a flight path generation method for generating a flight path for an aircraft capable of autonomously flying, the flight path generation method including: a step of acquiring airframe information including airframe IDs and take-off places of a plurality of aircraft; a step of acquiring movement information related to scheduled take-off times and destinations of the plurality of aircraft; a step of generating flight paths from the take-off places to landing places corresponding to the destinations based on the airframe information and the movement information; and a step of transmitting the flight paths to the aircraft.

Advantageous Effects of Invention

According to the present disclosure, it is possible to provide a flight path generation apparatus, an aircraft system, a flight path generation method, and a readable medium capable of efficiently managing a plurality of aircraft.

EXAMPLE EMBODIMENT

First Example Embodiment

Figure 1:
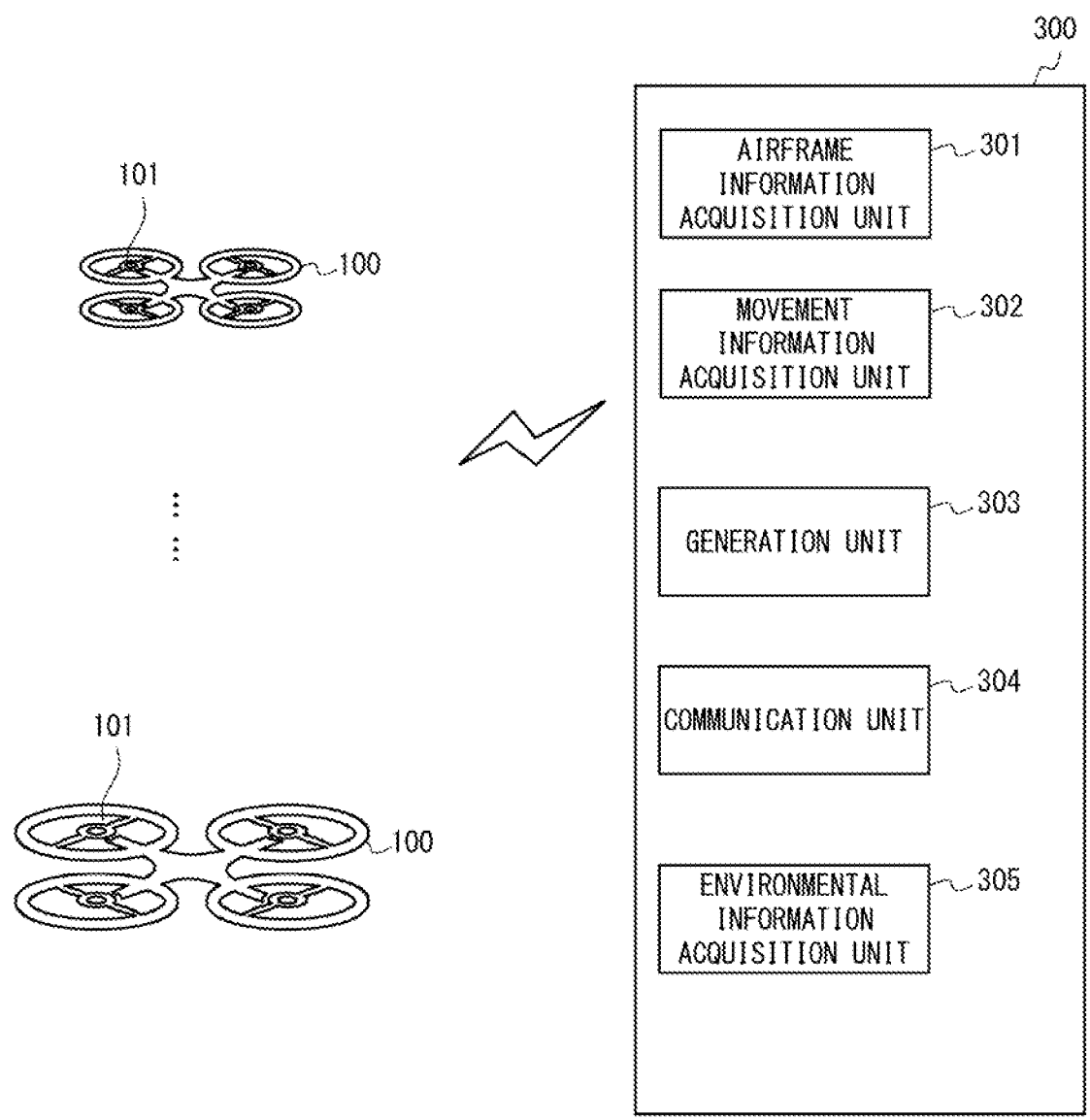
FIG. 1 is a schematic view showing an aircraft system 1 according to a first example embodiment.

An aircraft system 1 according to a first example embodiment will be described with reference to FIG. 1. FIG. 1 schematically shows the aircraft system 1. The aircraft system 1 includes a plurality of aircraft 100 and a flight path generation apparatus 300.

Each of the aircraft 100 is a rotary-wing aircraft including rotor blades 101. As the rotor blades 101 are rotationally driven, lift and thrust are generated. Note that, although the aircraft 100 includes four rotor blades 101 in FIG. 1, the number of rotor blades is not limited to any particular number. The plurality of aircraft 100 may be the same type of aircraft (e.g., the same model), or may be different types of aircraft.

Each of the aircraft 100 can autonomously fly. Examples of the aircraft 100 include drones, unmanned aerial vehicles (UAVs: Unmanned Aerial Vehicles), and flying cars. The aircraft 100 may be a vertical take-off and landing (Vtol: Vertical Take-Off and Landing) aircraft. The aircraft 100 may be a tilt-rotor aircraft. The aircraft 100 may be a helicopter. The aircraft 100 may be an unmanned aircraft loaded with luggage or the like, or may be a manned aircraft in which a crew(s) and/or a passenger(s) are on board.

The aircraft 100 can autonomously fly along a flight path (i.e., a flight route) from a take-off place to a landing place. For example, the aircraft 100 takes off from a take-off and landing facility and flies along a flight path. When the aircraft 100 has flown to the landing place corresponding to the destination, it lands on the landing place. The flight path is a 3D (three-dimensional) path from the take-off place to the landing place. The take-off place and the landing place are take-off and landing facilities designated in advance. Note that the take-off place and the landing place may be arbitrary places as long as there is an enough space for the landing therein. Needless to say, the take-off and landing facility on which the aircraft lands may be the same as the take-off and landing facility from which the aircraft has taken off.

The flight path generation apparatus 300 generates flight paths for the aircraft 100, which can autonomously fly. Then, the flight path generation apparatus 300 transmits the flight paths to the respective aircraft 100. The flight path generation apparatus 300 is an information processing apparatus such as a computer. For example, the flight path generation apparatus 300 is a server apparatus connected to a network such as the Internet. The flight path generation apparatus 300 is not limited to a physically single apparatus. For example, a plurality of processors may perform later-described processes in a cooperative manner. The flight path generation apparatus 300 includes an airframe information acquisition unit 301, a movement information acquisition unit 302, a generation unit 303, a communication unit 304, and an environmental information acquisition unit 305.

The airframe information acquisition unit 301 acquires airframe information including airframe IDs and take-off places of a plurality of aircraft. The aircraft IDs are identification numbers or the like for identifying the respective aircraft. A unique airframe ID is assigned to each of the aircraft 100. The take-off place is information indicating a place (coordinates) at which a take-off and landing facility in which the aircraft 100 is present is located. For example, the current position of the aircraft 100 is the take-off place.

The airframe information may include performance information about the performance of the aircraft 100. The performance information includes data on the weight, size, possible longest flight time, ability as to turning movement, tolerance to wind, maximum flight speed, and maximum flight altitude of the aircraft 100. The performance information may include data on the remaining amount of battery and/or the remaining amount of fuel during flight. Further, the performance information may include information indicating whether the aircraft is a manned aircraft or an unmanned aircraft. The airframe information may include information indicating whether the aircraft is an emergency aircraft such as a police aircraft, a fire aircraft, or an ambulance aircraft. The airframe information acquisition unit 301 may specify the performance information of the aircraft 100 based on the type (e.g., the model) and the airframe ID thereof.

The movement information acquisition unit 302 acquires movement information related to scheduled take-off times (scheduled take-off times) and destinations of the plurality of aircraft. The scheduled take-off time may be the current time or a time registered in advance. The estimated take-off times and the destinations are information entered by the users of the aircraft 100. Note that the destination may be a name of a place, a name of a facility, an address, coordinates (a latitude and a longitude), or the like. Further, the destination may be an ID or the like of the take-off and landing facility itself. Further, the movement information may include an intermediate point(s) between the take-off place to the landing place (i.e., a place(s) that the aircraft passes through or stops in the flight from the take-off place to the landing place).

The generation unit 303 generates a flight path (i.e., a flight route) based on the airframe information and the movement information. The flight path is a traveling path (i.e., a traveling route) from the take-off place to the landing place corresponding to the destination. The flight path is information indicating a trajectory that passes through target points of the aircraft 100. Further, a scheduled flight time may be associated with each of the target points in the flight path. The flight path is, for example, composed of a set of 3D (three-dimensional) coordinates indicating target points. Specifically, the flight path is data in which 3D coordinates are arranged in a chronological order. A flight path is generated by connecting 3D coordinates from one to another.

The generation unit 303 generates, for example, congestion information based on the airframe information and the movement information. The congestion information is an index indicating the congestion level of aircraft 100. The generation unit 303 divides the flight area into a plurality of spaces, and calculates, for each space, the number of aircraft that are simultaneously present in that space as congestion information. The generation unit 303 generates a flight path so that the number of aircraft present in any of the spaces does not exceed a predetermined number. Alternatively, the congestion information may be a value that is determined according to the distance between aircraft. The generation unit 303 generates a flight path so that a distance between one aircraft 100 and another aircraft does not decrease to a certain distance or shorter.

The landing place indicates the place (coordinates) of the take-off and landing facility. The generation unit 303 generates a flight path from the take-off place to a take-off and landing facility near the destination. For example, in the case where the destination is a name of a place, a name of a facility, an address or the like, a take-off and landing facility closest to the destination can be used as the landing place. Needless to say, the user may enter the take-off and landing facility itself as the destination. The flight path is a path in a 3D space. The generation unit 303 generates a flight path for each of the aircraft 100. The generation unit 303 generates a flight path when a destination, a scheduled flight time, and the like are input. For example, the generation unit 303 successively generates flight paths for the respective aircraft 100 in the order in which the movement information of these aircraft 100 have been input. Further, the generation unit 303 may generate a plurality of flight paths for one aircraft 100. For example, when there are a plurality of take-off and landing facilities near the destination, the generation unit 303 may generate a flight path to each of the take-off and landing facilities.

The environmental information acquisition unit 305 acquires environmental information about a flight environment. The environmental information may include, for example, weather information about the weather of the flight area. The weather information may include, for example, rain, fine weather, a wind speed, a wind direction, a precipitation, and the like. The environmental information acquisition unit 305 may divide the flight area into a plurality of areas, and acquire weather information for each of the divided areas.

The environmental information may include information indicating the presence/absence of a suspicious aircraft. Examples of the suspicious aircraft include an aircraft of which the airframe ID is not registered in advance. Further, the environmental information may include information indicating the presence/absence of an emergency aircraft. For example, in the flight area, information indicating a place where a suspicious aircraft or an emergency aircraft flies and/or a time of the flight can be used as environmental information. Various sensors for detecting environmental information may be provided. For example, environmental information may be measured by a wind velocity sensor and/or a rain sensor. Further, various sensors may be provided in the aircraft 100, so that environmental information may be acquired from the aircraft 100 at all times or as required.

The communication unit 304 transmits flight paths to aircraft 100. The communication unit 304 transmits a flight path to each of the aircraft 100. The communication unit 304 performs processing, for example, in conformity with communication standards such as 5G, 4G, Wi-Fi (Registered Trademark), and BlueTooth (Registered Trademark). The communication unit 304 transmits radio signals to aircraft 100 and a terminal(s) 400 (which will be described later). Further, the communication unit 304 receives radio signals from the aircraft 100 and the terminal(s) 400. In this way, data and information can be transmitted and received between the user side such as the aircraft 100 and the server side such as the flight path generation apparatus 300.

Figure 2:
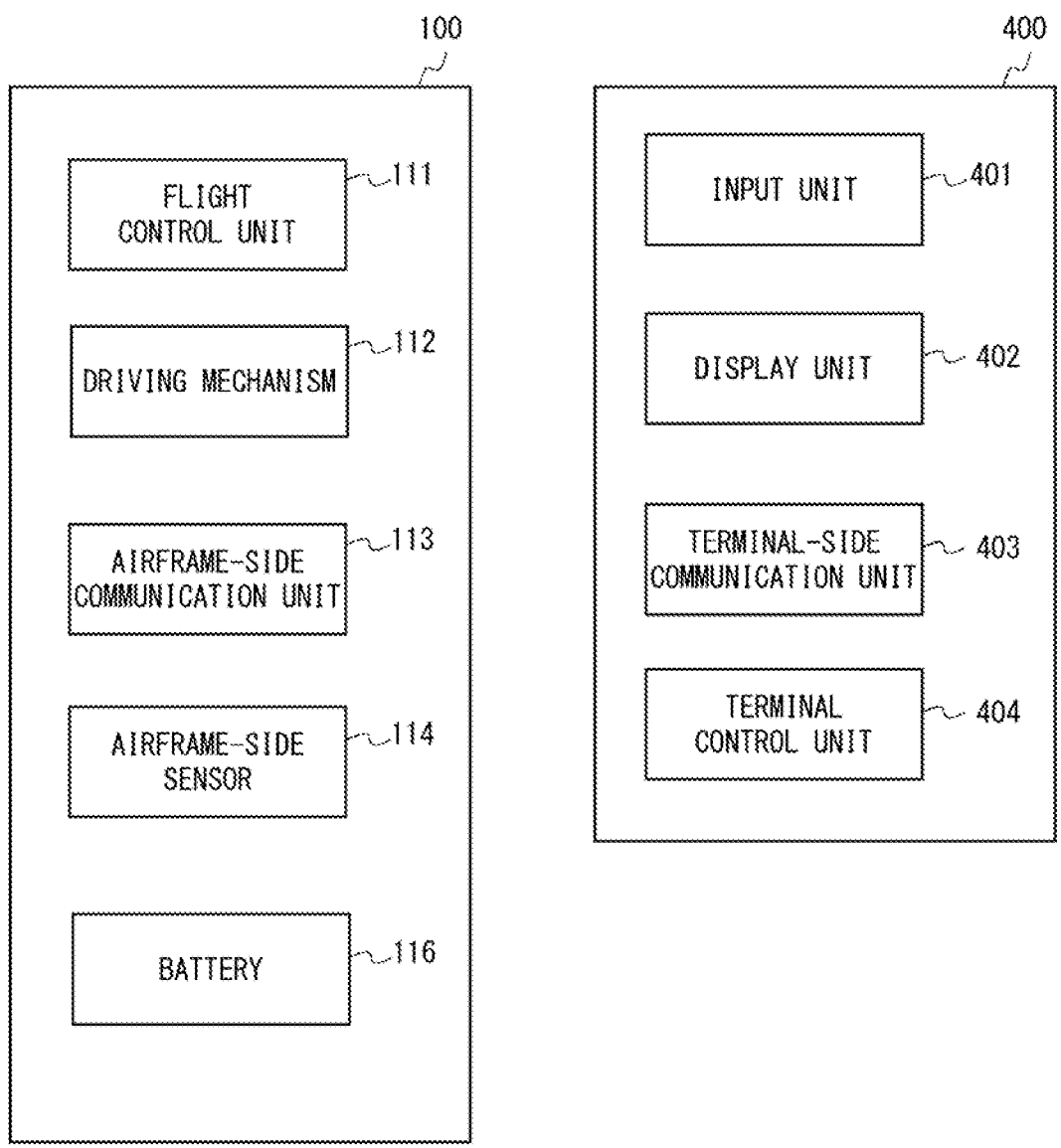
FIG. 2 is a control block diagram of the aircraft system 1.

Next, configurations of the aircraft 100 and the terminal 400 will be described. FIG. 2 is a functional block diagram showing configurations of the aircraft 100 and the terminal 400. The terminal 400 is an apparatus through which the user or the like of the aircraft 100 enters necessary information. The terminal 400 is, for example, an information processing apparatus such as a smartphone or a personal computer. The terminal 400 includes an input unit 401, a display unit 402, a terminal-side communication unit 403, and a terminal control unit 404. Note that at least some of the processes performed by the terminal 400 may be performed by a processor or the like provided in the aircraft 100. Further, the terminal 400 may be disposed in the aircraft 100.

The input unit 401 includes an input device such as a touch panel, a keyboard, a mouse, and a voice input microphone, and receives inputs from the user. For example, the user enters a destination, a scheduled take-off time, and the like by operating the input unit 401. Further, the user may enter an intermediate point(s) or the like between the take-off place and the landing place by operating the input unit 401. The display unit 402 includes a display device and displays a window or the like through which the user enters instructions or the like.

The terminal-side communication unit 403 wirelessly communicates with the aircraft 100 and the flight path generation apparatus 300. In this way, movement information such as a destination and a scheduled take-off time is transmitted to the aircraft 100 or to the flight path generation apparatus 300. The terminal control unit 404 controls each component. For example, the terminal control unit 404 includes a processor and a memory. The terminal control unit 404 controls each block by executing a control program stored in the memory.

The aircraft 100 includes a flight control unit 111, a driving mechanism 112, an airframe-side communication unit 113, an airframe-side sensor(s) 114, and a battery 116.

The flight control unit 111 controls each component. For example, the driving mechanism 112 includes rotor blades 101 and a motor therefor, and generates lift and thrust necessary for flight. The flight control unit 111 outputs a drive signal for controlling the driving mechanism 112. In the example shown in FIG. 1, the flight control unit 111 controls the driving mechanism 112 so that the driving mechanism 112 independently drives four rotor blades 101. The flight control unit 111 controls the driving mechanism 112 so that the aircraft 100 autonomously flies to the landing place. The aircraft 100 flies along a flight path.

The flight control unit 111 stores a flight path received from the flight path generation apparatus 300 in a memory or the like. The flight control unit 111 controls the driving mechanism 112 so that the aircraft 100 flies along the flight path received from the flight path generation apparatus 300. For example, the flight control unit 111 controls the driving mechanism 112 so that the position of the own aircraft moves along the flight path. When the position of the own aircraft is deviated from the flight path due to wind or the like, the aircraft 100 flies so as to get close to the flight path. The position of the own aircraft can be detected by the airframe-side sensor 114.

The airframe-side communication unit 113 wirelessly communicates with the ground side, i.e., with the flight path generation apparatus 300 or the terminal 400. The airframe-side communication unit 113 performs processing, for example, in conformity with communication standards such as 5G, 4G, Wi-Fi (Registered Trademark), and BlueTooth (Registered Trademark). The airframe-side communication unit 113 transmits radio signals to the ground side. The airframe-side communication unit 113 receives radio signals from the ground side. In this way, data and information can be transmitted and received between the aircraft 100 and the ground side. The communication between the flight path generation apparatus 300 and the terminal 400 may be wire communication. The airframe-side communication unit 113 receives a flight path from the flight path generation apparatus 300.

The airframe-side sensor 114 detects information about the flight state of the aircraft 100. The airframe-side sensor 114 includes, for example, a gyro sensor that detects the attitude of the airframe. Further, the airframe-side sensor 114 may include a position sensor that detects the position of the own aircraft. As the position sensor, for example, a satellite positioning sensor such as a GPS may be used. Further, the airframe-side sensor 114 may detect obstacles and other aircraft near the own aircraft. The flight control unit 111 controls the driving mechanism 112 based on the result of the detection by the airframe-side sensor 114. In this way, the aircraft 100 can autonomously fly along the flight path from the take-off place to the landing place. The airframe-side sensor 114 is not limited to one sensor, and may include a plurality of sensors. The battery 116 supplies electric power to each apparatus (i.e., to each unit).

The aircraft 100 is autonomously flying along the flight path. The flight path generation apparatus 300 generates, based on movement information and aircraft-type information of each of a plurality of aircraft 100, flight paths for the respective aircraft 100. In this way, it is possible to efficiently manage the plurality of aircraft 100. For example, aircraft 100 can fly while avoiding a crowded area. Aircraft 100 can fly without getting close to any of the other aircraft 100. Since aircraft 100 are not affected by any of the other aircraft, each of the aircraft 100 can fly more safely and more efficiently. For example, an aircraft 100 does not need to perform a movement for avoiding other aircraft 100 according to the result of the detection by the airframe-side sensor 114. It is possible to shorten flight times and reduce fuel consumption in the whole system.

Further, the generation unit 303 may generate a flight path based on performance information. For example, the generation unit 303 generates a flight path so that the performance (i.e., conditions) indicated by the performance information is satisfied. The performance information is the weight, size, possible longest flight time, ability as to turning movement, tolerance to wind, maximum flight speed, and maximum flight altitude of the aircraft 100. The performance information may include the current battery remaining amount and/or the current fuel remaining amount. For example, when the power source is an electric motor, the battery remaining amount is included in the performance information.

Further, when the power source is an internal combustion engine, the fuel remaining amount such as the remaining amount of gasoline is included in the performance information. Alternatively, when fuel cells are used as the battery 116, the fuel remaining amount such as the remaining amount of hydrogen is included in the performance information. When an internal combustion engine and an electric motor are used together as the power source, both the battery remaining amount and the fuel remaining amount may be included in the performance information. Further, the performance information may include information indicating whether the aircraft is a manned aircraft or an unmanned aircraft. For example, when the possible longest flight time is included as the performance information, a flight path is generated so as not to exceed the possible longest flight time. Specifically, the generation unit 303 shortens the flight distance for an aircraft 100 of which the possible longest flight time is short. That is, the generation unit 303 generates a flight path along which the aircraft 100 can fly without exceeding the possible longest flight time. Needless to say, the generation unit 303 can generate a flight path so as to satisfy performance (i.e., conditions) other than the possible longest flight time.

Further, in the case where the aircraft 100 is an emergency aircraft, the generation unit 303 may preferentially generate a flight path for that aircraft 100, i.e., for the emergency aircraft. For example, the generation unit 303 generates a flight path so that the aircraft 100, which is an emergency aircraft, can arrive at the destination or the intermediate point more quickly.

The generation unit 303 may generate a flight path based on environmental information. The environmental information may include, for example, weather information about the weather in the flight area. The weather information may include, for example, rain, fine weather, a wind speed, a wind direction, a precipitation, and the like. Further, the environmental information includes movement information of aircraft which are flying near the own aircraft. Further, the environmental information may include information indicating that a suspicious unknown aircraft is flying. For example, the generation unit 303 can generate a flight path so as to avoid a rainy area and/or a windy area. Further, the generation unit 303 may generate a flight path based on the environmental information and the performance information. It is assumed that, for example, the performance information includes a tolerance to wind. It is assumed that a wind velocity on an area-by-area basis is included in the environmental information. The generation unit 303 generates a flight path so as to avoid an area(s) in which the wind velocity exceeds a flyable wind velocity indicated by the tolerance to wind. Aircraft can be operated more safely and more efficiently. As described above, the generation unit 303 can generate a flight path by referring to the environmental information and the performance information.

The generation unit 303 may generate a flight path in a dynamic manner. For example, when the flight path generation apparatus 300 has acquired new information, it changes already-generated flight paths. As a result, the flight paths of aircraft 100 that are currently flying are updated. Then, the flight path generation apparatus 300 transmits the updated flight paths to the aircraft 100, which are flying. The aircraft 100 receive the updated flight paths. In this way, the aircraft 100 fly along the newly updated flight paths. In this way, a plurality of aircraft 100 can be operated more efficiently.

For example, when the flight path generation apparatus 300 has received movement information for a new aircraft 100, it generates a flight path for the new aircraft 100. The generation unit 303 changes already-generated flight paths based on this newly-generated flight path. Note that movement information for the other aircraft 100 is used as environmental information. For example, in the case where the new aircraft 100 is an emergency aircraft, the flight paths for aircraft 100 other than the emergency aircraft are updated so that this new aircraft 100 can arrive at the destination or the intermediate point earlier. That is, the generation unit 303 updates the flight paths for aircraft 100 that are flying near the flight path of the emergency aircraft. In this way, aircraft can be operated more efficiently.

Further, when information indicating that a suspicious aircraft such as a suspicious drone is flying is acquired as environmental information, the generation unit 303 updates flight paths. For example, the generation unit 303 updates flight paths so as to avoid an area(s) in which the suspicious aircraft is present (i.e., is flying).

Alternatively, the generation unit 303 may change already-generated flight paths when the weather information has changed. For example, when bad weather such as heavy rain or strong wind occurs, the generation unit 303 updates flight paths so as to avoid the bad weather area(s). Alternatively, when the weather has improved, the area(s) in which aircraft have not been able to fly until then becomes a flyable area(s). In this case, the generation unit 303 updates flight paths so as to pass through the new flyable area. In this way, aircraft can be operated more efficiently. In this case, the generation unit 303 can update flight paths so as to satisfy the performance (i.e., conditions) such as a tolerance to wind.

Further, when the weather has worsened and a strong wind occurs, the battery remaining amount or the fuel remaining amount may decrease more rapidly than expected. Alternatively, owing to changes in the weather, the battery remaining amount or the fuel remaining amount may decrease more slowly than expected. In such a case, the generation unit 303 may update flight paths based on the performance information indicating the latest battery remaining amount or the latest fuel remaining amount. That is, when the flight path generation apparatus 300 has newly acquired the battery remaining amount or the fuel remaining amount, the generation unit 303 may update flight paths.

Further, the flight path generation apparatus 300 may charge the users of aircraft 100 some fees. For example, the generation unit 303 generates a flight path while associating a usage fee with it. Then, when the aircraft 100 has flown along the flight path, the user of the aircraft 100 is charged the usage fee. The usage fee may be paid in actual money (currency) or in reward points.

When users are charged usage fees, a usage fee may be set for each landing facility. For example, a high price may be set for a take-off and landing facility which is frequently used, and a low price may be set for a take-off and landing facility which is infrequently used. Further, a usage fee may be set for each flight area. For example, a high price may be set for an area which is frequently used, and a low price may be set for an area which is infrequently used. Further, the fee may be changed according to the time of day. For example, a high price may be set in a time period during which a lot of aircraft fly, and a low price may be set in a time period during which not many aircraft fly.

As described above, the generation unit 303 can set a usage fee for each flight path according to the usefulness thereof. Needless to say, some flight paths may be free. Further, the generation unit 303 may adopt dynamic pricing for the usage fee. The generation unit 303 can set the usage fee according to the current congestion level or the like.

Further, users may be charged monthly or annual usage fees. In this case, it is possible to set a plurality of fixed-price plans. In a low-price fixed-price plan, one usage fee is set as a normal usage fee. In a high-price fixed-price plan, one usage fee is reduced from a normal usage fee or is free.

Further, the generation unit 303 may generate a plurality of flight paths for one aircraft 100. The communication unit 304 transmits a plurality of flight paths to the terminal 400 or the aircraft 100 as flight path candidates. The flight path generation apparatus 300 presents (i.e., shows) the plurality of flight path candidates to the user. The display unit 402 of the terminal 400 displays the flight path candidates. The display unit 402 may present flight paths to the user through AR (Augmented Reality) display or VR (Virtual Reality) display. For example, the display unit 402 displays flight paths on a head-mounted display or the like. Alternatively, the display unit 402 may perform AR display by projecting a display image including flight paths onto the windshield or the like. Then, the user selects one of a plurality of displayed flight path candidates by operating the input unit 401. The flight path candidate selected by the user is stored as the flight path in the memory in the aircraft 100.

Note that the flight path generation apparatus 300 may present (i.e., show) usage fees together with the flight path candidates. The generation unit 303 generates a plurality of flight paths while associating usage fees with the respective flight paths. The communication unit 304 transmits the usage fees together with the flight path candidates to the terminal 400. Then, the display unit 402 displays the flight path candidates together with the usage fees.

The user selects a flight path candidate according to the usage fee. For example, the user can select a flight path candidate of which the price is low though the flight time is long. Alternatively, the user can select a flight path candidate of which the flight time is short though the price is high. As described above, the user selects a suitable flight path from the presented flight path candidates. The user can select a suitable flight path, so that the usefulness can be improved.

The generation unit 303 may generate a flight path based on the history of flights of an individual user, or based on preference information of the user which is input (i.e., registered) in advance. Further, when the aircraft 100 includes a camera as the airframe-side sensor 114, the generation unit 303 can generate a flight path that passes through a scenic intermediate point(s). The user can view a video image of scenery taken (i.e., filmed) by (the camera of) the aircraft 100 during flight.

When the user is charged the usage fee, it may be determined whether or not the aircraft 100 has flown along the flight path. The aircraft system 1 may determine whether or not to charge the user the usage fee according to the result of the determination. For example, when the aircraft 100 has flown along the flight path, the flight path generation apparatus 300 charges the user the usage fee. When the aircraft 100 has not flown along the flight path, the flight path generation apparatus 300 does not charge the user the usage fee. That is, when the aircraft 100 has flown along a path other than the presented flight path, the flight path generation apparatus 300 does not charge the user the usage fee.

The flight path generation apparatus 300 may determine whether or not the aircraft 100 has flown along the flight path. The flight path generation apparatus 300 compares flight points through which the aircraft 100 has actually flown with the flight path, and thereby determines whether or not the aircraft has flown along the flight path. Then, the flight path generation apparatus 300 can charge the user the fee according to the result of the comparison. That is, when the actual flight points are located along the selected flight path, the aircraft system 1 charges the user the usage fee.

Note that the flight points of the aircraft 100 may be detected so that they are used as the basis (or the grounds) for the charging. The flight points of the aircraft 100 during the flight can be detected, for example, by using the ADS-B (Automatic Dependent Surveillance-Broadcast). Alternatively, the flight points of the aircraft 100 during the flight may be detected by using a satellite positioning sensor such as a GPS. The aircraft 100 stores the flight points in a chronological order. Then, the aircraft 100 transmits the flight points to the flight path generation apparatus 300 while associating the respective flight times with them. The flight path generation apparatus 300 determines whether or not the aircraft has flown along the flight path based on the flight points which are recorded in the chronological order.

Although the flight path generation apparatus 300 performs a determination process and the like for the charging in the above description, the aircraft 100 and the terminal 400 may perform at least a part of the determination process. That is, any of the aircraft 100, the terminal 400, and the flight path generation apparatus 300 may perform the process for comparing the flight points with the flight path.

Specifically, the aircraft 100 may store the trajectory of the flight points in a memory or the like, and the aircraft 100 may compare the flight points with the flight path. Alternatively, the aircraft 100 may transmit the flight points to the flight path generation apparatus 300 or the terminal 400 during the flight or after the landing. Then, the flight path generation apparatus 300 or the terminal 400 may compare the flight points with the flight path. Further, the aircraft system 1 charges the user the usage fee according to the result of the comparison.

Other Example Embodiment

Figure 3:
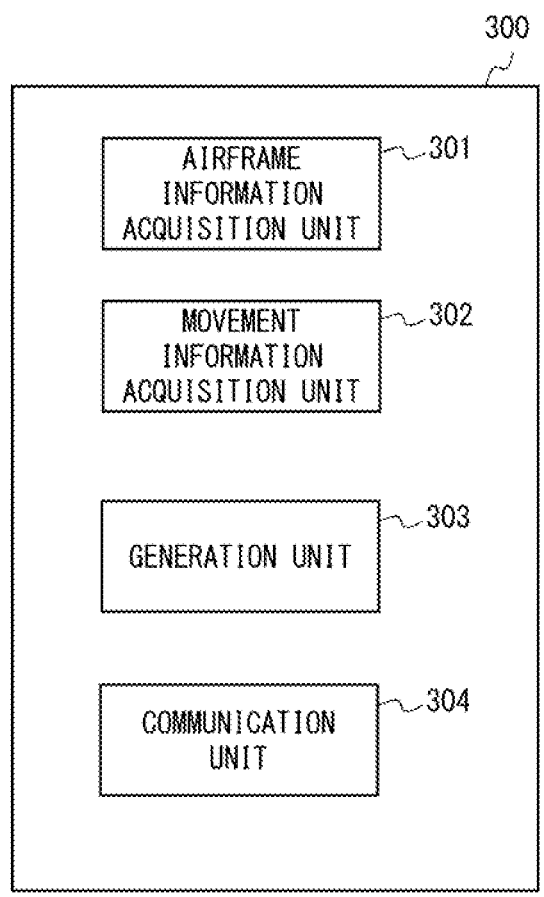
FIG. 3 is a schematic view showing a flight path generation apparatus according to another example embodiment.

A flight path generation apparatus 300 according to another example embodiment will be described with reference to FIG. 3. The flight path generation apparatus 300 is a flight path generation apparatus that generates flight paths for aircraft that can autonomously fly. The flight path generation apparatus 300 includes an airframe information acquisition unit 301, a movement information acquisition unit 302, a generation unit 303, and a communication unit 304.

The airframe information acquisition unit 301 acquires airframe information including airframe IDs and take-off places of a plurality of aircraft. The movement information acquisition unit 302 acquires movement information related to scheduled take-off times and destinations of a plurality of aircraft. The generation unit 303 generates flight paths from take-off places to landing places corresponding to the destinations based on the airframe information and the movement information. The communication unit 304 transmits the flight paths to the aircraft. In this way, aircraft can be efficiently operated.

<Example of Hardware Configuration>

Figure 4:
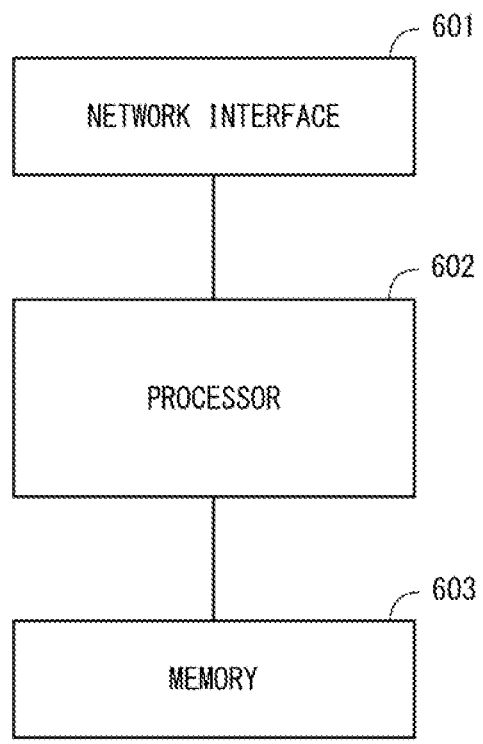
FIG. 4 is a block diagram showing an example of a hardware configuration.

An example of a hardware configuration of an apparatus according to the first example embodiment or other example embodiments will be described. FIG. 4 is a block diagram showing an example of a hardware configuration for performing information processing in each of the flight path generation apparatus 300, the terminal 400, and the aircraft 100. Referring to FIG. 4, the flight path generation apparatus 300 or the like includes a network interface 601, a processor 602, and a memory 603. The network interface 601 is used to communicate with a network node (e.g., an eNB, an MME, or a P-GW). The network interface 601 may include, for example, a network interface card (NIC) in conformity with IEEE 802.3 series. Note that the eNB represents an evolved Node B, the MME represents a Mobility Management Entity, and the P-GW represents a Packet Data Network Gateway. The IEEE stands for Institute of Electrical and Electronics.

The processor 602 loads software (a computer program) from the memory 603 and executes the loaded software, so that the processor 602 performs the processes performed by the flight path generation apparatus 300 or the like described in the above-described example embodiment. The processor 602 may be, for example, a microprocessor, an MPU, or a CPU. The processor 602 may include a plurality of processors.

The memory 603 is composed of a combination of a volatile memory and a nonvolatile memory. The memory 603 may include a storage remotely located from the processor 602. In this case, the processor 602 may access the memory 603 through an I/O (Input/Output) interface (not shown).

In the example shown in FIG. 4, the memory 603 is used to store a group of software modules. The processor 602 loads the group of software modules (a computer program (s)) from the memory 603 and executes the loaded software modules, so that the processor 602 can perform the processes performed by the flight path generation apparatus 300 or the like described in the above-described example embodiment.

As described above with reference to FIG. 4, each of the processors included in the flight path generation apparatus 300 and the like in the above-described example embodiment executes one or a plurality of programs including a set of instructions for causing a computer to perform the algorithm described above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (floppy disks, magnetic tapes, hard disk drives), optical magnetic storage media (e.g., magneto-optical disks), CD-ROM (Read Only Memory), CD-R, CD-R/W, and semiconductor memories (e.g., mask ROM, PROM (Programmable ROM), EPROM (Erasable PROM), flash ROM, and RAM (Random Access Memory)). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments, and they may be modified as appropriate without departing from the scope and spirit of the disclosure.

Although the present invention has been described with reference to example embodiments (and examples), the present invention is not limited to the above-described example embodiments (and examples). The configuration and details of the present invention may be modified within the scope of the present invention in various ways that can be understood by those skilled in the art.

The whole or part of the example embodiments disclosed above can be described as, but not limited to, the following supplementary notes.

(Supplementary Note 1)

A flight path generation apparatus configured to generate a flight path for an aircraft capable of autonomously flying, comprising:
  an airframe information acquisition unit configured to acquire airframe information including airframe IDs and take-off places of a plurality of aircraft;
  a movement information acquisition unit configured to acquire movement information related to scheduled take-off times and destinations of the plurality of aircraft;
  a generation unit configured to generate flight paths from the take-off places to landing places corresponding to the destinations based on the airframe information and the movement information; and
  a communication unit configured to transmit the flight paths to the aircraft.

(Supplementary Note 2)

The flight path generation apparatus described in Supplementary note 1, wherein
  the generation unit generates a plurality of flight paths for one aircraft, and
  the communication unit transmits the plurality of flight paths as flight path candidates.

(Supplementary Note 3)

The flight path generation apparatus described in Supplementary note 2, wherein
  the generation unit generates a plurality of flight paths while associating a usage fee with each of the flight paths, and
  the communication unit transmits the usage fees together with the flight path candidates.

(Supplementary Note 4)

The flight path generation apparatus described in Supplementary note 3, wherein a flight point through which the aircraft has actually flown is compared with the flight path, and the usage fee is charged.

(Supplementary Note 5)

The flight path generation apparatus described in any one of Supplementary notes 1 to 4, wherein the airframe information includes performance information about performance of the aircraft.

(Supplementary Note 6)

The flight path generation apparatus described in Supplementary note 5, wherein the flight path is updated based on the performance information.

(Supplementary Note 7)

The flight path generation apparatus described in any one of Supplementary notes 1 to 6, further comprising an environmental information acquisition unit configured to acquire environmental information about a flight environment, wherein the flight path is updated based on the environmental information.

(Supplementary Note 8)

An aircraft system configured to generate a flight path for an aircraft capable of autonomously flying, comprising:

an airframe information acquisition unit configured to acquire airframe information including airframe IDs and take-off places of a plurality of aircraft;

a movement information acquisition unit configured to acquire movement information related to scheduled take-off times and destinations of the plurality of aircraft;

a generation unit configured to generate flight paths from the take-off places to landing places corresponding to the destinations based on the airframe information and the movement information;

a communication unit configured to transmit the flight paths to the aircraft; and an aircraft configured to autonomously fly along a flight path received from the communication unit.

(Supplementary Note 9)

The aircraft system described in Supplementary note 8, further comprising an airframe-side sensor provided to detect a flight point, wherein the generation unit generates the flight path while associating a usage fee with the flight path, and a flight point through which the aircraft has flown is compared with the flight path, and a user is charged the user fee associated with the flight path according to a result of the comparison.

(Supplementary Note 10)

The aircraft system described in Supplementary note 8, wherein the generation unit generates a plurality of flight paths for one aircraft, and the communication unit transmits the plurality of flight paths as flight path candidates.

(Supplementary Note 11)

The aircraft system described in Supplementary note 10, wherein the generation unit generates a plurality of flight paths while associating a usage fee with each of the flight paths, and the communication unit transmits the usage fees together with the flight path candidates.

(Supplementary Note 12)

The aircraft system described in Supplementary note 10, wherein a flight point through which the aircraft has actually flown is compared with the flight path, and the usage fee is charged.

(Supplementary Note 13)

The aircraft system described in any one of Supplementary notes 8 to 12, wherein the airframe information includes performance information about performance of the aircraft.

(Supplementary Note 14)

The aircraft system described in Supplementary note 13 wherein the flight path is updated based on the performance information.

(Supplementary Note 15)

The aircraft system described in any one of Supplementary notes 8 to 14, further comprising an environmental information acquisition unit configured to acquire environmental information about a flight environment, wherein the flight path is updated based on the environmental information.

(Supplementary Note 16)

A flight path generation method for generating a flight path for an aircraft capable of autonomously flying, comprising:

a step of acquiring airframe information including airframe IDs and take-off places of a plurality of aircraft;

a step of acquiring movement information related to scheduled take-off times and destinations of the plurality of aircraft;

a step of generating flight paths from the take-off places to landing places corresponding to the destinations based on the airframe information and the movement information; and a step of transmitting the flight paths to the aircraft.

(Supplementary Note 17)

A non-transitory computer readable medium storing a program for causing a computer to perform a flight path generation method for generating a flight path for an aircraft capable of autonomously flying, the flight path generation method comprising:

a step of acquiring airframe information including airframe IDs and take-off places of a plurality of aircraft;

a step of acquiring movement information related to scheduled take-off times and destinations of the plurality of aircraft;

a step of generating flight paths from the take-off places to landing places corresponding to the destinations based on the airframe information and the movement information; and a step of transmitting the flight paths to the aircraft.

REFERENCE SIGNS LIST

100 AIRCRAFT
101 ROTOR BLADE
111 FLIGHT CONTROL UNIT
112 DRIVING MECHANISM
113 AIRFRAME-SIDE COMMUNICATION UNIT
114 AIRFRAME-SIDE SENSOR
116 BATTERY
300 FLIGHT ROUTE GENERATION APPARATUS
301 AIRFRAME INFORMATION ACQUISITION UNIT
302 MOVEMENT INFORMATION ACQUISITION UNIT
303 GENERATION UNIT
304 COMMUNICATION UNIT
305 ENVIRONMENTAL INFORMATION ACQUISITION UNIT
400 TERMINAL
401 INPUT UNIT
402 DISPLAY UNIT

403 TERMINAL-SIDE COMMUNICATION UNIT
404 TERMINAL CONTROL UNIT

What is claimed is:

1. A flight path generation apparatus comprising:
at least one memory configured to store instructions; and
at least one processor configured to execute the instructions stored in the memory to:
acquire airframe information including airframe IDs and take-off places of a plurality of aircrafts;
acquire movement information related to scheduled take-off times and destinations of the plurality of aircrafts;
generate, as flight path candidates, a plurality of flight paths from the take-off places to landing places corresponding to the destinations based on the airframe information and the movement information;
generate congestion information indicating congestion level of the plurality of aircrafts the based on the airframe information and the movement information;
generate the flight path candidates while associating a usage fee with each flight path candidate;
set the usage fee according to the congestion information;
transmit a plurality of usage fees together with the flight path candidates;
select a flight path from among the flight path candidates for one aircraft, from among the plurality of aircrafts; and
control the one aircraft to fly along the selected flight path.

2. The flight path generation apparatus according to claim 1, wherein a flight point through which the one aircraft has actually flown is compared with the selected flight path, and the usage fee is charged.

3. The flight path generation apparatus according to claim 1, wherein the airframe information includes performance information about performance of the one aircraft.

4. The flight path generation apparatus according to claim 3, wherein the selected flight path is updated based on the performance information.

5. The flight path generation apparatus according to claim 1, further comprising an environmental information acquisition unit configured to acquire environmental information about a flight environment, wherein
the selected flight path is updated based on the environmental information.

6. A flight path generation method for generating a flight path for an aircraft capable of autonomously flying, comprising:
acquiring airframe information including airframe IDs and take-off places of a plurality of aircrafts;
acquiring movement information related to scheduled take-off times and destinations of the plurality of aircrafts;
generating, as flight path candidates, a plurality flight paths from the take-off places to landing places corresponding to the destinations based on the airframe information and the movement information;
generating congestion information indicating congestion level of the plurality of aircrafts the based on the airframe information and the movement information;
generating the flight path candidates while associating a usage fee with each flight path candidate;
setting the usage fee according to the congestion information;
transmitting a plurality of usage fees together with the flight path candidates;
selecting a flight path from among the flight path candidates for one aircraft, from among the plurality of aircrafts; and
controlling the one aircraft to fly along the selected flight path.

7. The flight path generation method according to claim 6, wherein a flight point through which the one aircraft has actually flown is compared with the selected flight path, and the usage fee is charged.

8. The flight path generation method according to claim 6, wherein the airframe information includes performance information about performance of the selected aircraft.

9. The flight path generation method according to claim 8, wherein the selected flight path is updated based on the performance information.

10. The flight path generation method according to claim 6, further comprising an environmental information acquisition unit configured to acquire environmental information about a flight environment, wherein
the selected flight path is updated based on the environmental information.

11. A non-transitory computer readable medium storing a program for causing a computer to perform a flight path generation method for generating a flight path for an aircraft capable of autonomously flying, the flight path generation method comprising:
acquiring airframe information including airframe IDs and take-off places of a plurality of aircrafts;
acquiring movement information related to scheduled take-off times and destinations of the plurality of aircrafts;
generating, as flight path candidates, a plurality of flight paths from the take-off places to landing places corresponding to the destinations based on the airframe information and the movement information;
generating congestion information indicating congestion level of the plurality of aircrafts the based on the airframe information and the movement information;
generating the flight path candidates while associating a usage fee with each flight path candidate;
setting the usage fee according to the congestion information;
transmitting a plurality of usage fees together with the flight path candidates;
selecting a flight path from among the flight path candidates for one aircraft, from among the plurality of aircrafts; and
controlling the one aircraft to fly along the selected flight path.

12. The non-transitory computer readable medium according to claim 11, wherein a flight point through which the one aircraft has actually flown is compared with the selected flight path, and the usage fee is charged.

13. The non-transitory computer readable medium according to claim 11, wherein the airframe information includes performance information about performance of the one aircraft.

14. The non-transitory computer readable medium according to claim 13, wherein the selected flight path is updated based on the performance information.

* * * * *